United States Patent
Woods

(10) Patent No.: US 10,376,956 B2
(45) Date of Patent: Aug. 13, 2019

(54) EXTRUDABLE MIXTURE FOR USE IN 3D PRINTING SYSTEMS TO PRODUCE METAL, GLASS AND CERAMIC ARTICLES OF HIGH PURITY AND DETAIL

(71) Applicant: THE VIRTUAL FOUNDRY, LLC, Stoughton, WI (US)

(72) Inventor: Bradley D. Woods, Stoughton, WI (US)

(73) Assignee: THE VIRTUAL FOUNDRY, LLC, Stoughton, WI (US)

( * ) Notice: Subject to any disclaimer, the term of this patent is extended or adjusted under 35 U.S.C. 154(b) by 0 days.

(21) Appl. No.: 15/144,159

(22) Filed: May 2, 2016

(65) Prior Publication Data

US 2017/0312820 A1 Nov. 2, 2017
US 2018/0193912 A9 Jul. 12, 2018

Related U.S. Application Data

(60) Provisional application No. 62/156,900, filed on May 5, 2015.

(51) Int. Cl.
*B22F 1/00* (2006.01)
*B33Y 70/00* (2015.01)
(Continued)

(52) U.S. Cl.
CPC .......... *B22F 1/0062* (2013.01); *B22F 1/0014* (2013.01); *B22F 1/0059* (2013.01);
(Continued)

(58) Field of Classification Search
CPC .......... B22F 5/12; B22F 1/004; B22F 1/0048; B22F 1/0051; B22F 1/0059; B22F 1/0062;
(Continued)

(56) References Cited

U.S. PATENT DOCUMENTS 3,717,462 A 2/1973 Negishi et al.
4,854,970 A 8/1989 Wiech, Jr.
(Continued)

FOREIGN PATENT DOCUMENTS

JP 59143001 A 8/1984
JP 63403 A 1/1988

*Primary Examiner* — Alexandre F Ferre
(74) *Attorney, Agent, or Firm* — Charles S. Sara; Elizabeth L. Neal; DeWitt LLP

(57) ABSTRACT

There is disclosed an article which is formed of a solid-phase or liquid-phase sintered product of a metal powder, ceramic powder or glass powder. For manufacturing the article, an extrudable mixture which contains the material powder and a thermoplastic binder is shaped into a continuous filament suitable for use in fused filament 3D printers. The printed object is then invested in plaster or other castable refractory. The invested object is then subjected to heating. The heating process burns off the thermoplastic binder and sinters the powders of metal, glass or ceramic, leaving a pure metal, glass or ceramic object. The extrudable mixture is produced by preparing a material powder, preparing a binder, then blending the material powder and the binder together. The extrudable mixture is then extruded into a continuous filament suitable for use in various 3d printing hardware.

11 Claims, 1 Drawing Sheet

(51) Int. Cl.
*C03C 8/14* (2006.01)
*C04B 35/638* (2006.01)
*C04B 35/634* (2006.01)
*B22F 3/20* (2006.01)
*B22F 3/10* (2006.01)
*C03C 8/18* (2006.01)
*B22F 3/00* (2006.01)

(52) U.S. Cl.
CPC ............... *B33Y 70/00* (2014.12); *C03C 8/14* (2013.01); *C03C 8/18* (2013.01); *C04B 35/634* (2013.01); *C04B 35/638* (2013.01); *B22F 3/008* (2013.01); *B22F 3/1021* (2013.01); *B22F 3/20* (2013.01); *B22F 2301/10* (2013.01); *B22F 2301/255* (2013.01); *B22F 2302/45* (2013.01); *B22F 2304/10* (2013.01); *C03C 2205/00* (2013.01); *C04B 2235/40* (2013.01); *C04B 2235/6021* (2013.01); *C04B 2235/6026* (2013.01); *C04B 2235/9661* (2013.01)

(58) Field of Classification Search
CPC ............... B22F 1/0074; B22F 2201/01; B22F 2302/45; B22F 2304/10; B22F 2998/10; B22F 3/004; B22F 3/008; B22F 3/1021; B22F 3/1055; B22F 3/16; B22F 3/20; B22F 3/225

See application file for complete search history.

(56) References Cited

U.S. PATENT DOCUMENTS

| | | | |
|---|---|---|---|
| 5,328,775 A | | 7/1994 | Hoshino et al. |
| 5,602,197 A | * | 2/1997 | Johnson ............... C04B 35/632 264/344 |
| 5,698,800 A | * | 12/1997 | Hoshino ............... B22F 1/0059 419/2 |
| 2004/0243133 A1 | * | 12/2004 | Materna ................. A61L 27/04 606/76 |
| 2005/0251275 A1 | * | 11/2005 | Carlson ............... G05B 19/4097 700/98 |
| 2015/0080495 A1 | * | 3/2015 | Heikkila ............. B29C 67/0055 523/223 |
| 2015/0125334 A1 | * | 5/2015 | Uetani ...................... B22F 5/10 419/6 |

* cited by examiner

*1.* A 3D printed object (D) that is invested in a castable refractory (E) is heated to the vaporization point of the thermoplastic (C)

*2.* The 3D printed object (D) is further heated to the sintering point of the metal, glass, or ceramic powder (B) it contains

*3.* Powder (B) sinters/fuses to itself, retaining the shape of the void created in the castable refractory (E) by the 3D printed object (D)

EXTRUDABLE MIXTURE FOR USE IN 3D PRINTING SYSTEMS TO PRODUCE METAL, GLASS AND CERAMIC ARTICLES OF HIGH PURITY AND DETAIL

BACKGROUND OF THE INVENTION

1. Field of the Invention

The present invention relates to a 3D printed article for fabrication, ornamentation, artistic handicrafts or the like, and a method for manufacturing the same, and further to an extrudable mixture specifically adapted to be employed in the manufacture of the metal, glass or ceramic article and a method for producing the extrudable mixture itself.

2. Prior Art

Japanese Patent Application laid open with Publication No. 59-143001 describes one conventional method for manufacturing ornamental articles or artistic handicrafts, which involves preparing powders of metal such as gold (Au), platinum (Pt) and silver (Ag); adding binders such as clay, glue, boiled rice or wheat flour to them; subsequently mixing them together with water to produce a moldable mixture; modeling an article of a prescribed shape in this moldable mixture; and drying the resulting article at about 100.degree. C.

Japanese Patent Application laid open with Publication No. 63-403 describes another conventional manufacturing method which includes preparing powder of metal such as nickel (Ni); adding bentonite as binder; mixing them together with water to produce an moldable mixture; modeling an article of a prescribed shape in this mixture; leaving the resulting article at room temperature for a prolonged period of time to remove water; and subsequently sintering it in a reducing atmosphere at 1,250.degree. C.

In the above methods, various binders such as clay, glue, boiled rice, wheat flour or bentonite are added.

SUMMARY OF THE INVENTION

It is therefore a primary object of the present invention to provide a metal, glass or ceramic article by method of extrusion, injection and fused filament fabrication (3d printing) on generally available desktop 3d printing hardware.

Another object of the invention is to provide a method specifically adapted to manufacture the above metal, glass or ceramic article.

A further object is to provide a method for producing the extrudable mixture itself.

According to a first aspect of the invention, there is provided a printed article consisting essentially of a solid-phase or liquid-phase sintered product of a metal powder free of binder, whereby assuming the general properties of the powder it contains.

According to a second aspect of the invention, there is provided a method for manufacturing a printed article comprising an extrudable mixture containing a metal, glass or ceramic powder and a thermoplastic binder which is removable while sintering, shaping the mixture into a prescribed molded object invested in plaster, and subjecting the molded object to solid-phase sintering operation to provide the printed article free of the binder, retaining a high level of detail. Various methods can be developed using the basic idea of this method, and various kinds of metal, glass and ceramic articles of high purity and detail can be produced.

According to a third aspect of the invention, there is provided an extrudable mixture for use in the manufacture of a metal, glass or ceramic article, containing a metal, glass or ceramic powder and a thermoplastic binder mixed with the powder. It is required that the thermoplastic binder employed to prepare the mixture be removable during the manufacture of the metal article. It has been found that Poly Lactic Acid (PLA) is suitable for these purposes. Furthermore, in order to impart other characteristics as necessary, the mixture can be modified in various ways. However, it is the most preferable that it consists essentially of 80 to 92% by weight of a metal, glass or ceramic powder, 8 to 20% by weight of a thermoplastic binder, unavoidable impurities.

According to a fourth aspect of the invention, there is provided a method for producing an extrudable mixture for use in the manufacture of a metal, glass or ceramic article by 3d printing, comprising the steps of preparing a metal, glass or ceramic powder, preparing and blending the metal powder with a binder.

Finally, according to a fifth aspect of the invention, the sintered object can be rendered of solid metal by heating it while in contact with a source metal of a lower melting temperature. While the filler material becomes molten, the sintered metal object absorbs the secondary metal by means of capillary action. Leaving a solid metal object.

DETAILED DESCRIPTION OF THE INVENTION

Figure 1:
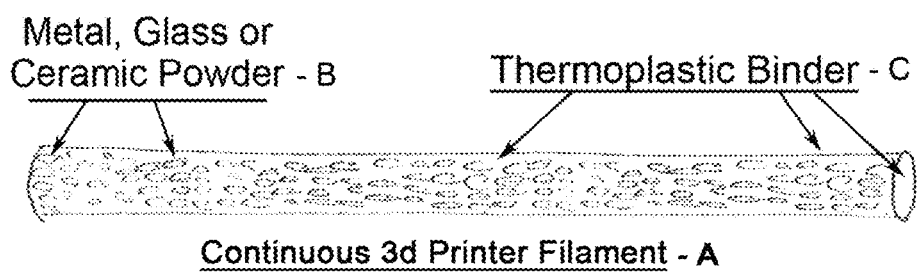
FIG. 1
A. Continuous 3d Printer Filament
B. Metal, Glass or Ceramic Powder
C. Thermoplastic Binder
FIG. 2
D. 3D Printed Object
B. Metal, Glass or Ceramic Powder
C. Thermoplastic Binder
FIG. 3
D. 3d Printed Object
E. Castable refractory
Figure 2:
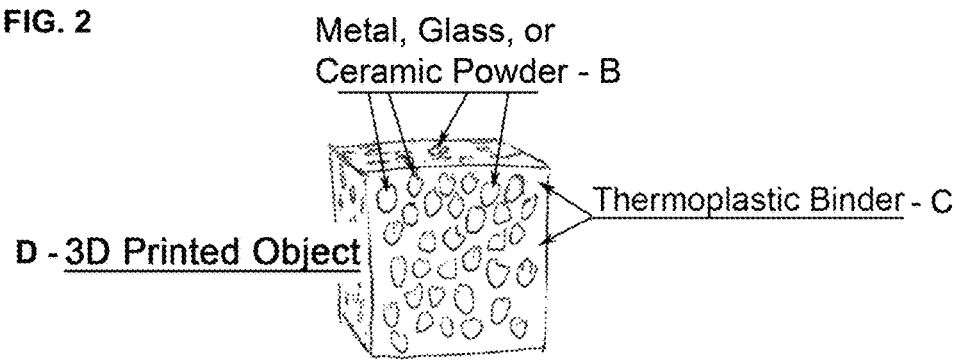
Figure 3:
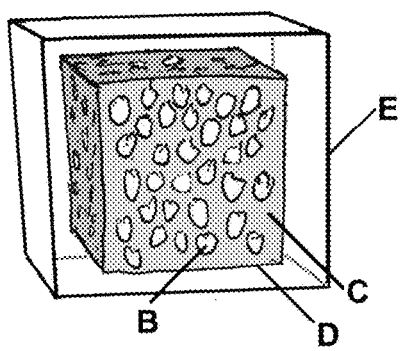

The inventor has made an extensive study to obtain a metal, glass or ceramic article containing no binder, and have come to know that when a thermoplastic binder used it is removed entirely during the sintering process. Thus, the resulting article is free of binder, and is essentially comprised of a high purity sintered product of metal, glass or ceramic.

Thus, the metal article in accordance with the present invention consists essentially of a solid-phase sintered product of a metal, glass or ceramic powder free of any binder, and assumes the properties of the metal, glass or ceramic that the mixture contains.

According to the present invention, the article is manufactured by the steps of preparing an extrudable mixture containing powdered metal, glass or ceramic and a binder which is removable by heat, investing the object in plaster, and subjecting the mixture to a sintering operation.

More specifically, there is first prepared an extrudable mixture containing a metal, glass or ceramic powder and a thermoplastic binder.

Then, the extrudable mixture of powdered metal, glass or ceramic is printed into a prescribed shape, the printed object is encased, invested, in plaster, then sintered under predetermined conditions. Thus, the binder is removed during the sintering operation, while the shape is retained by the plaster investment, and a metal, glass or ceramic article free of the binder is manufactured.

Various modifications of the manufacturing method of a metal, glass or ceramic article will now be described.

In the foregoing, if a coloring agent is mixed into the powdered glass or ceramic, a glassy layer of a desired color can be obtained. The shape of the article is of course arbitrary.

Next, the extrudable mixture for use in the manufacture of the above metal, glass or ceramic article and the method for producing the same will be described.

As previously mentioned, the extrudable mixture in accordance with the invention is characterized in that it contains a metal, glass or ceramic powder and a thermoplastic binder mixed with the powder. The use of the thermoplastic as the binder ensures that the binder is removed during the sintering step. For producing the extrudable mixture, a thermoplastic and metal, glass or ceramic powder are mechanically mixed, then shaped into the a feedstock to be used in 3d printing.

The reasons for the limitations on the composition of the most preferred extrudable mixture are as follows:

(a) Metal, Glass, Ceramic Powder

Powders of metal such as gold, silver, copper, platinum and their alloys, and glass and ceramic are main constituents for the extrudable material to be obtained. If the powder content is less than 80% by weight, desired effects cannot be obtained. On the other hand, if the content exceeds 92% by weight, the resulting extrudable material is inferior in extensibility and strength. Therefore, the content of the powder has been determined so as to range from 80 to 92% by weight.

In addition, if the average particle size of the metal powder exceeds 400 .mu.m, the extensibility and strength deteriorate. Therefore, it is preferable that the average particle size of the metal powder is no less than 100 um and no greater than 400 .mu.m.

(b) Thermoplastic Binder

When heated, the thermoplastic becomes malleable, so that it is very easy to to feed through the 3d printer. However, if the binder content is less than 8% by weight, such an advantage cannot be obtained. On the other hand, if the metal content exceeds 92% by weight, it becomes difficult to print with the mixture. Therefore, the content of the thermoplastic binder is determined so as to range from 8 to 20% by weight.

What is claimed is:

1. A system for creating a metal object comprising:
   a metal article manufactured by 3D printing, comprising an extrudable mixture, the extrudable mixture containing 80 to 92% by weight of particles of a metal powder, 8 to 20% by weight of a thermoplastic binder mixed with said metal powder, wherein the thermoplastic binder comprises polylactic acid (PLA), wherein the particles directly contact the thermoplastic binder; and
   a castable refractory for solid-phase or liquid-phase sintering encasing the metal article, being cast in place around the metal article.

2. The extrudable mixture according to claim 1, wherein said extrudable mixture contains metal powder and a powder of the binder material.

3. The extrudable mixture according to claim 1, wherein said extrudable mixture is formed into a continuous extruded filament before being printed by the 3D printer.

4. The article of claim 1, wherein the 3D printer is a fused filament 3D printer.

5. The system of claim 1, wherein the castable refractory comprises a plaster material.

6. The system of claim 1, further comprising a source metal having a lower melting temperature than the metal powder.

7. A system for creating a metal, glass or ceramic object, consisting essentially of:
   a metal, glass or ceramic article manufactured by 3D printing, comprising an extrudable mixture, the extrudable mixture containing 80 to 92% by weight of particles of a metal, glass or ceramic powder, 8 to 20% by weight of thermoplastic binder, wherein the thermoplastic binder comprises PLA, balance unavoidable impurities, wherein the particles directly contact the thermoplastic binder; and
   a castable refractory for solid-phase or liquid-phase sintering encasing the metal, glass or ceramic article, being cast in place around the metal, glass or ceramic article.

8. The extrudable mixture according to claim 7, wherein said metal, glass or ceramic powder has an average particle size of less than 100 μm to 400 μm.

9. The extrudable mixture according to claim 7, wherein said extrudable mixture is formed into a continuous extruded filament before being printed by the 3D printer.

10. The extrudable mixture according to claim 7, wherein said extrudable mixture further comprises a coloring agent.

11. The system of claim 7, wherein the castable refractory comprises a plaster material.

\* \* \* \* \*